United States Patent Office 3,736,278
Patented May 29, 1973

3,736,278
NIL SHRINK UNSATURATED POLYESTER
RESIN COMPOSITION
Moriyasu Wada, Ninomiya, and Hiroshi Enoki and Katsuya Kumagai, Yokohama, Japan, assignors to Tokyo Shibaura Electric Company, Ltd., Kawasaki-shi, Japan
Filed Dec. 22, 1971, Ser. No. 210,829
Claims priority, application Japan, Dec. 23, 1970, 45/115,818
Int. Cl. C08g 17/00, 17/04
U.S. Cl. 260—22 CB                5 Claims

ABSTRACT OF THE DISCLOSURE

A nil shrink or low profile unsaturated polyester resin composition has been formed by blending (A) 5–20% by weight of a saturated polyester resin produced by the reaction of an alcohol component containing 20–80 mol percent of neopentyl glycol, and an acid component containing 70–95 mol percent terephthalic acid and/or isophthalic acid, (B) 25–60% by weight of an unsaturated polyester resin containing a double bond equivalency of 142–165, produced by the reaction of an acid component containing maleic acid, maleic acid anhydride and/or fumaric acid, and an alcohol component, and (C) 60–30% by weight of an unsaturated monomer copolymerizable with the above-mentioned unsaturated polyester resin (B).

The saturated polyester resin composition is characterized by nil shrink (e.g., low extent of volume shrinkage during curing), good dimensional stability, high dimensional accuracy, crack and craze resistance and good electrical properties over varying temperatures.

BACKGROUND OF THE INVENTION

Field of the invention

This invention relates to a nil shrink unsaturated polyester resin composition having a low degree of volume shrinkage during curing, good dimensional stability, high dimensional accuracy, crack and craze resistance and good electrical properties over varying temperatures.

Description of the prior art

In general, unsaturated polyester resins will exhibit about a 5–10% degree of volume shrinkage during curing. Even the alkyd premix molding powder materials, which are blends of resin with inorganic fillers or reinforcing fibers, known for their low degree of shrinkage, will exhibit as much as 0.2–0.6% in volume shrinkage during molding. This small degree of shrinkage has been shown to be detrimental, especially in situations in which it is used for molding onto larger sized metal inserts such as in the preparation of slip-rings for motors. In these instances, the combination of thermal expansion coefficient of the metal and the volume shrinkage of the molding material can combine to yield cracks. Moreover, in those situations in which a high degree of accuracy in molded dimensions is required, such as in the formation of motor end brackets, a mold shrinkage of even 0.2–0.6% (as measured by the method of JIS K6911) can be detrimental.

It has been proposed to alleviate this problem by using different acid and/or alcohol components in the preparation of the unsaturated polyester, or by varying the degree of unsaturation or by the use of different cross-linking agents. Although some degree of success was achieved, other mechanical and thermal properties were adversely affected.

It has also been proposed to reduce mold shrinkage by admixture with various thermoplastic resins. During the curing of the unsaturated polyester, the thermoplastic resins are separated and deposited out, and these particles will expand to a sufficient degree to offset the mold shrinkage effect. It has been suggested, for instance, to add a variety of thermoplastic resins including (a) homopolymers of lower alkyl esters of methacrylic acid, (b) polystyrene, (c) copolymers of lower alkyl esters of methacrylic acid or acrylic acid and methyl methacrylate, (d) copolymers of methyl methacrylate and lauroyl methacrylate; isobornyl methacrylate, acrylamide or acrylonitrile, etc.

It was found, however, what when vinyl polymers are used, owing to their characteristic immiscibility with the unsaturated polyester resins, separation can occur quite rapidly in the liquid state, so that severe handling difficulties after mixing can occur. The compositions containing the vinyl polymers also result in a generally non-uniform molding shrinkage and a greater tendency to adhere to the mold surface, and the appearance and lustre of the molded product is often quite poor.

Polyethylene powder has also been used in attempts to control mold shrinkage, but since it is insoluble in the usual cross-linking agents for the unsaturated polyester, such as styrene, the effect in the composition is generally unsatisfactory.

It has further been suggested to increase the quantity of styrene to control the degree of mold shrinkage. However, by increasing the quantity of styrene, the mechanical properties are decreased.

SUMMARY OF THE INVENTION

Accordingly, it is one object of this invention to provide a nil shrink unsaturated polyester resin composition which possesses good dimensional stability, high dimensional accuracy, crack and craze resistance and good electrical properties over variable temperatures.

This and other objects have now herein been attained by providing a nil shrink unsaturated polyester resin composition formed by blending (A) 5–20% by weight of a saturated polyester resin produced by the reaction of an alcohol component containing 20–80 mol percent of neopentyl glycol (dimethyl trimethylene glycol), and an acid component containing 70–90 mol percent terephthalic acid and/or isophthalic acid, (B) 25–60% by weight of an unsaturated polyester resin containing a double bond equivalency of 142–165 produced by the reaction of an acid component containing maleic acid, maleic acid anhydride and/or fumaric acid, and an alcohol component, and (C) 60–30% by weight of an unsaturated monomer copolymerizable with the above mentioned unsaturated polyester resin (B).

DETAILED DESCRIPTION OF THE INVENTION

The saturated polyester resin used in the present composition can be produced by esterification of an alcohol component containing 20–80 mol percent of ethylene glycol, propylene glycol or diethylene glycol, or mixtures thereof, and 80–20 mol percent of neopentyl glycol (namely, dimethyl trimethylene glycol), and an acid component containing 70–95 mol percent of either terephthalic acid or isophthalic acid or mixtures thereof and 30–5 mol percent of phthalic acid anhydride, succinic acid, adipic acid, azelaic acid or sebacic acid or mixtures thereof. In particular, the saturated polyester resin may be prepared from a given quantity of neopentyl glycol as the alcohol component, and from a given quantity of terephthalic acid, or isophthalic acid, as the acid component.

If the proportion of neopentyl glycol in the alcohol component is less than 20 mol percent, its effect on reducing the extent of shrinkage will be small. In order to maximize the shrinkage loss, therefore, it is most desirable to use a large proportion of the saturated polyester resin component. However, too much neopentyl glycol will prevent the obtaining of a mechanically strong cured resinous material.

If the proportion of neopentyl glycol in the alcohol component is greater than 80 mol percent, the additional glycol will not further improve the extent of shrinkage, and if too much glycol is used, a highly crystalline resin will be formed which will be of little practical usefulness.

Figure 1:
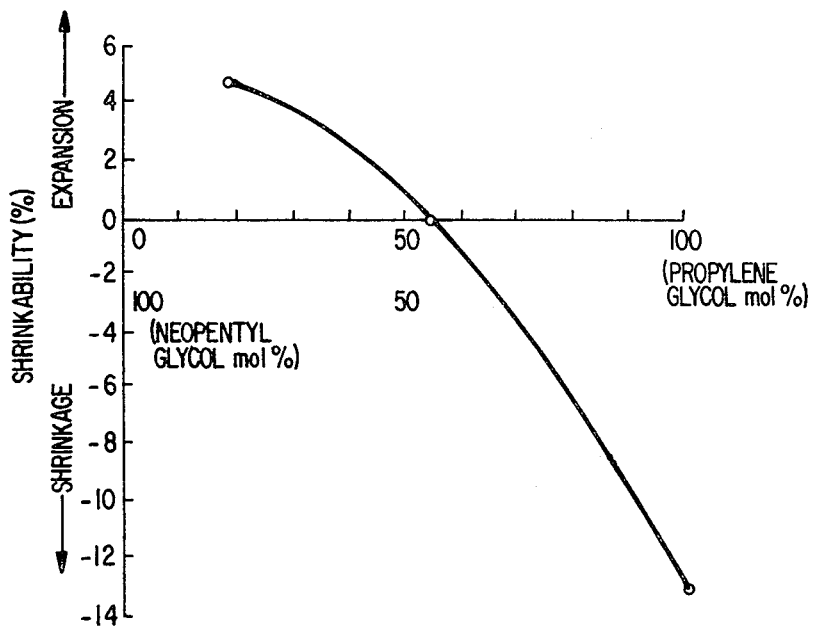
FIG. 1 is a diagram which shows the relationship between the proportion (mol percent) of neopentyl glycol and shrinkage, in accordance with this invention.

FIG. 1, for instance, shows the effect of varying the quantity of neopentyl glycol. For the purpose of comparison, a 16% by weight saturated polyester resin, produced by the reaction of 95 mol percent of isophthalic acid and propylene glycol-neopentyl glycol system; 42% by weight of an unsaturated polyester resin, having a double bond equivalency of 142; and 42% by weight of a styrene monomer, were mixed and formed into a resinous composition. The proportion of the neopentyl glycol component was varied and the relationship between the proportion of neopentyl glycol component and the degree of molding shrinkage was measured by measuring the specific gravity before and after curing.

The proportion of isophthalic acid and the terephthalic acid in the acid component of the saturated polyester resin should be about 70–95 mole percent. When the proportion is less than 70 mol percent, deposition and separation in the final curing step will not occur, and no, or very little decrease in shrinkage will be attained. If the quantity of the acid used is greater than 95 mol percent, the saturated polyester resin will tend to crystallize in the solution of the styrene monomer and will separate from the unsaturated polyester resin mixture.

The proportion of saturated polyester resin is usually from 5–20% by weight. If less than 5% by weight of the saturated polyester resin is used, very little decrease in shrinkage will be attained. If the proportion is greater than 20% by weight, the mechanical strength of the cured resin composition will be adversely affected.

The unsaturated polyester resin used herein may be prepared from a variety of systems, for instance, maleic acid anhydride-propylene glycol, fumaric acid-propylene glycol-ethylene glycol, maleic acid anhydride-ethylene glycol-diethylene glycol, or the like. The acid component is preferably maleic acid anhydride, fumaric acid or their mixtures. If other unsaturated polyester resins are used, the desired nil shrink unsaturated polyester resin will not be obtained.

The unsaturated polyester resin composition should be present in amounts of from 25–60% by weight, based on the weight of unsaturated polyester resin and copolymerizable monomer. If greater than 60% by weight is used, the desired nil shrinkability will not be obtained.

Figure 2:
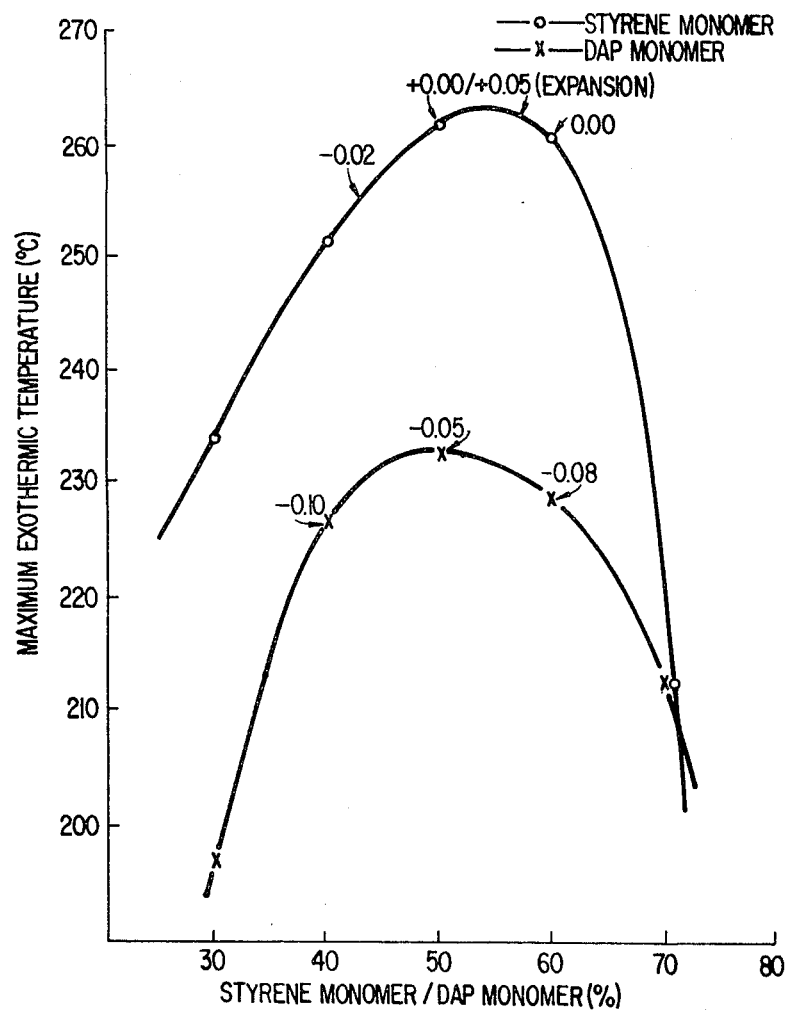
FIG. 2 is a diagram which shows the relationship between the maximum exothermic temperature during copolymerization and the quantity of unsaturated monomer which is added to the unsaturated polyester resin, in accordance with this invention.

FIG. 2 shows the maximum exothermic temperature, as measured by JIS K6901, for hot curing of resin compositions containing various proportions of an unsaturated polyester resin prepared by the reaction of 1 mol of maleic acid anhydride and 1.05 mol of propylene glycol, which is characterized by an acid value of 25 and a double bond equivalency of 156, and using either styrene monomer or diallylphthalate monomer. The line (a) shows the results when styrene was used as the monomer, and line (b) shows the results when diallylphthalate is used. The higher the maximum exothermic temperature, the lower will be the extent of the molding shrinkage.

Suitable copolymerizable monomers which may be used herein as a cross-linking agent for the unsaturated polyester resin include styrene, vinyl toluene, chlorostyrene, divinyl benzene, diallylphthalate, diallylisophthalate, triallyltrimeritate, triallylcyanurate, triallylisocyanurate or the like. The copolymerizable monomer should be used in amounts of from 60–30% by weight, as indicated above.

When the nil shrink unsaturated polyester resin composition of this invention is heated and cured with a polymerizable catalyst, the molding shrinkage will be no more than 0–2%. The nil shrink unsaturated polyester resin composition of this invention can, in fact, occasionally show expansion, depending upon the proportion of components contained in the composition.

It is desirable to cross-link the resin composition to as high a degree as practical, since the higher the degree of cross-linking the higher will be the heat distortion temperature of the composition.

Various conventional inorganic fillers can be incorporated into the composition, and their use in this combination can result in a molding shrinkage as low as 0.1–0%.

By appropriate adjustment of the components of the present composition, it is possible to obtain a premix molding powder having a positive shrinkage (i.e., expansion). Thus, when the nil shrink unsaturated polyester resin composition of this invention is used, the molds can be formed having good dimensional stability, high dimensional accuracy, crack and craze resistance and good electrical properties over varying temperatures.

Having now generally described the invention, a further understanding can be obtained by reference to certain specific Examples which are provided herein for purposes of illustration only and are not intended to be limiting unless otherwise specified.

EXAMPLE 1

An unsaturated polyester resin having an acid value of 25, and a double bond equivalency of about 156 was prepared by the esterification reaction of 1.05 mol of propylene glycol and 1 mol of maleic acid anhydride.

The unsaturated polyester resin was then dissolved in styrene monomer, to form a 35% by weight solution of the unsaturated polyester resin in the styrene monomer (hereinafter referred to as sample 1). 150 p.p.m. of hydroquinone (polymerization inhibitor) was added to this solution (sample 1).

A saturated polyester resin having an acid value of 15, was prepared by the esterification reaction of 6.5 moles of propylene glycol, 4.0 mol of neopentyl glycol, 9.5 mol of isophthalic acid and 0.5 mol of orthophthalic acid anhydride. This saturated polyester resin was then dissolved in styrene monomer, to form a 35% by weight solution of the saturated polyester resin in the styrene monomer (hereinafter referred to as sample A).

A saturated polyester resin having an acid value of 14, was prepared by the esterification reaction of 1.1 mol of propylene glycol and 1 mol of isophthalic acid at a maximum reaction temperature of 222° C. This saturated polyester resin was dissolved in styrene monomer, to form a 35% by weight solution of the saturated polyester resin in the styrene monomer (hereinafter referred to as sample a).

These resin solutions (sample 1, sample A and sample a) were admixed as shown in Table I, and were added respectively to 50% by weight of a phthalic acid dioctyl paste in 2% by weight of benzoyl peroxide. Thus, Example 1 and Control 1 were prepared as shown in Table I.

TABLE I

| | Example | Control 1 |
|---|---|---|
| Component (by wt. percent): | | |
| Sample 1 | 60 | 60 |
| Sample A | 40 | |
| Sample a | | 40 |

The above two compositions were heated at a temperature of 120° C. for 40 minutes and were respectively cured into plate form. In Example 1, an opaque and smooth plate was obtained, whereas in the control 1, a transparent plate having a multiplicity of cracks was obtained. The cure shrinkability was calculated by measuring specific gravity before and after curing and was found to be 0.5% for Example 1, but was more than 8% in control 1.

EXAMPLE 2

A saturated polyester resin having an acid value of 20 was prepared by the esterification reaction of 6 mol of neopentyl glycol, 4.5 mol of propylene glycol, 8 mol of isophthalic acid and 2 mol of phthalic acid anhydride at a maximum reaction temperature of 225° C. This saturated polyester resin was dissolved in styrene monomer to form a 35% by weight solution of the saturated polyester resin in the styrene monomer (hereinafter referred to as sample B). Sample B was added to 100 p.p.m. of p-methoxyphenol.

A 35% by weight of a mixed polyester resin solution (hereinafter referred to as sample b) was prepared by dissolving 15 parts by weight of polyethyl methacrylate and 85 parts by weight of polymethyl methacrylate in styrene monomer. Sample b was added to p-methoxyphenol.

Thereafter, sample B, sample b, and sample 1, prepared as in Example 1, and fillers, such as calcium carbonate powder, were admixed in definite proportions (parts by weight) as shown in Table II. Thus, premix molding powder materials were prepared.

TABLE II

| | Example | Control 2 |
|---|---|---|
| Component (parts by wt.): | | |
| Calcium carbonate KS 200 (trade name, manufactured by Kitto Funkako K.K. in Japan) | 58 | 58 |
| Zinc stearate | 1.5 | 1.5 |
| Resin component: | | |
| Sample 1 | 13.2 | 13.2 |
| Sample B | 8.8 | |
| Samble b | | 8.8 |
| t-Butyl perbenzoate | 0.2 | 0.2 |
| Benzoyl peroxide | 0.15 | 0.15 |

When the premix molding powder materials prepared as above described were molded at a temperature of 140–145° C., shrinkage was measured by the method of JIS K6911, respectively. Shrinkage was +0.01% in the example (expansion), but −0.05% in control 2.

Moreover, the release from the mold was much easier using the composition of Example 2 than with control 2.

Next, 13.2 parts by weight of the above-mentioned sample 1 and 8.8 parts by weight of sample B, or sample b, were admixed, respectively. Then, unsaturated polyester resin compositions were prepared. In this case, the mixture of sample 1 and sample B was perfectly transparent in appearance and miscible homogeneously. The mixture maintained homogeneity even after 1,000 hours. On the contrary, the mixture of sample 1 and sample b was opaque in appearance, and after 4 hours partial separation occurred; after 8 hours, complete separation occurred.

EXAMPLE 3

A saturated polyester resin having an acid value of 23 was prepared by the esterification reaction of 6 mol of neopentylglycol, 5 mol of propylene glycol, 7 mol of isophthalic acid and 3 mol of succinic acid. This saturated polyester resin was dissolved in styrene monomer. A 30% by weight solution of the saturated polyester resin in styrene monomer (hereinafter referred to as sample C) was prepared.

Thereafter, 100 parts by weight of sample C and 1 part by weight of magnesia (trade name: Kyowa Mag 150, manufactured by Kyowa Chemical Industry K.K. in Japan) were mixed together, and were maintained for 4 days at room temperature after stirring.

A saturated polyester resin was prepared by the esterification reaction of 6 mol of 2,3-butanediol, 5 mol of propylene glycol, 7 mol of isophthalic acid and 3 mol of succinic acid. This saturated polyester resin was dissolved in styrene monomer, and a 30% by weight solution of the saturated polyester resin solution in styrene monomer (hereinafter referred to as sample c) was prepared.

Thereafter, 100 parts by weight of this sample c and 1 part by weight of magnesia (trade name, Kyowa Mag 150, manufactured by Kyowa Chemical Industry K.K. in Japan) were mixed together, and were maintained for 4 days at room temperature after stirring.

An unsaturated polyester resin having a double bond equivalency of about 162 was prepared by the esterification reaction of 10 mol of fumaric acid, 8.5 mol of propylene glycol and 2.0 mol of diethylene glycol. This unsaturated polyester resin was dissolved in styrene monomer, and 70% by weight of the unsaturated polyester resin solution of styrene monomer (hereinafter referred to as sample 2) was prepared. 150 p.p.m. of hydroquinone (polymerization protector) was added to this solution (sample 2).

The unsaturated polyester resin compositions were prepared respectively by selecting and mixing of sample C, sample c, sample 2, and a curing catalyst in proportions (parts by weight) as shown in Table III.

TABLE III

| | Example | Control 3 |
|---|---|---|
| Component (parts by wt.): | | |
| Sample 2 | 60 | 60 |
| Sample C | 40 | |
| Sample c | | 40 |
| t-Butyl-perbenzoate | 1 | 1 |
| Benzoyl peroxide (50% dioctyl phthalate paste) | 0.5 | 0.5 |

Thereafter, the unsaturated polyester resin composition as above described, and fillers, such as calcium carbonate, were admixed in the proportions (parts by weight) shown in Table IV. Thus, premix molding powder materials were prepared.

TABLE IV

| | Example | Control 4 |
|---|---|---|
| Component (parts by wt.): | | |
| Resin component: | | |
| Example (in Table III) | 22 | 0 |
| Control 3 (in Table III) | | 22 |
| Calcium carbonate NS 200 (trade name, manufactured by Nitto Funkako K. K. in Japan) | 62 | 62 |
| Zinc stearate | 1.2 | 1.2 |
| ¼-inch glass particles | 14 | 14 |
| Vinylon fiber (6 denier) | 0.7 | 0.7 |

When the premix molding powder materials prepared as above described were molded at a temperature of 140–145° C., shrinkability was measured by the method of JIS K6911, respectively. Shrinkability was 0.05–0.07% in the example, but 0.6–0.7% in the control 4.

Also, 60 parts by weight of the above sample 2, 40 parts by weight of the above sample C, 1% by weight of t-butyl perbenzoate and 0.5% by weight of benzoyl peroxide (50% paste) were admixed and an unsaturated polyester resin composition was prepared. Cure-shrinkability as calculated by measuring the specific gravity before and after curing (at 50° C., for 1 hour), was +0.09% (expansion).

EXAMPLE 4

An unsaturated polyester resin having an acid value of 20 and a double bond equivalency of about 150, was prepared by the esterification reaction of 6.5 mol of propylene glycol, 4 mol of ethyleneglycol and 10 mol of maleic acid anhydride.

This unsaturated polyester resin was dissolved in diallyl phthalate monomer, and 70% by weight of the unsaturated polyester resin solution of diallyl phthalate monomer (hereinafter referred to as sample 3) was prepared 100 p.p.m. of hydroquinone was added to this solution (sample 3).

A saturated polyester resin having an acid value of 25, a softening point of 100–102° C., as measured by the ball ring method, was prepared by the esterification reaction of 6.5 mol of neopentylglycol, 4.0 mol of propyleneglycol, 9.5 mol of isophthalic acid and 0.5 mol of phthalic acid anhydride.

This unsaturated polyester resin was dissolved in diallyl phthalate monomer, and a 35% by weight solution of the unsaturated polyester resin solution in diallyl phthalate monomer (hereinafter referred to as sample D) was prepared.

A saturated polyester resin was prepared by the esterification reaction of 6 mol of 2,3-butanediol, 5 mol of propylene glycol, 7 mol of isophthalic acid and 3 mol of succinic acid.

Thus, the saturated polyester resin was dissolved in diallyl phthalate monomer, and 35% by weight of the saturated polyester resin solution of diallyl phthalate monomer (hereinafter referred to as sample d) was prepared.

Thereafter, sample 3, sample D, sample d and fillers, such as calcium carbonate powder, were admixed in the proportions (parts by weight) as shown in Table V. Thus, premix molding powder materials were prepared.

TABLE V

| | Example | Control 5 |
|---|---|---|
| Components (parts by wt.): | | |
| Resin component: | | |
| Sample 3 | 15 | 15 |
| Sample D | 10 | |
| Sample d | | 10 |
| Calcium carbonate NS 200 (trade name, manufactured by Nitto Funkako K.K. in Japan) | 58 | 58 |
| Zinc stearate | 1.8 | 1.8 |
| ¼-inch glass particles | 15 | 15 |
| t-Butyl-perbenzoate | 0.1 | 0.1 |
| Benzoyl peroxide | 0.5 | 0.5 |

When the premix molding powder materials prepared as above described were molded at a temperature of 140–145° C., shrinkability, as measured by the method of JIS K6911, was 0.00% in the example, but 0.82% in control 5.

Also, instead of the diallyl phthalate dissolved saturated polyester resin in sample D of the above resin component (Table V), triallyl trimeritate, triallyl cyanurate or triallylisocyanurate were used, respectively, at the same conditions (components), and the premix molding powder materials were prepared. Shrinkability in molding was +0.015% (expansion) in the case of triallyltrimeritate, 0.008% in the case of triallylcyanurate and +0.012% in the case of triallylisocyanurate.

EXAMPLE 5

The saturated polyester resin in sample C of Example 3 was dissolved in vinyl toluene monomer, and was mixed with 100 p.p.m. of p-methoxyphenol.

The unsaturated polyester resin in sample 1 of Example 1 was dissolved in vinyl toluene monomer, and was mixed with 100 p.p.m. of hydroquinone.

Thereafter, 4 parts ( by weight) of 30% by weight of the above-described saturated polyester resin solution, 6 parts (by weight) of 70% by weight of the above-described unsaturated polyester resin solution, 1% by weight of t-butyl perbenzoate and 0.5% by weight of benzoyl peroxide (50% paste) were mixed and blended to form a low shrinkable unsaturated polyester resin composition. 23 parts by weight of the above resin composition, 62 parts by weight of calcium carbonate NS 200 (trade name), 1 part of zinc stearate and 14 parts by weight of ¼-inch glass particles were admixed to prepare the premix molding powder materials. When the premix molding powder materials were molded at a temperature of 140–145° C., molding shrinkage was measured by the method of JIS K6911, and it was found that molding shrinkage was −0.02 to −0.03% (shrinkage).

On the other hand, instead of the saturated polyester resin solution in the above-mentioned premix molding powder material, the equivalent amount of finely powdered polyethylene and vinyl monomer were used in the same way, and it was found that the molding shrinkage was −0.8 to −0.85%.

EXAMPLE 6

Ester Resin —20 (trade name, manufactured to Toyobo K.K. in Japan) of neopentyl saturated polyester was dissolved in styrene monomer, and a 30% by weight solution of the neopentyl saturated polyester resin in styrene monomer was prepared. 40 parts by weight of this resin solution and 60 parts by weight of the unsaturated polyester resin solution (100 p.p.m. of hydroquinone were added) of sample 1 in Example 1 were mixed, and a resin composition was prepared. The resin composition was added to 1% by weight of t-butyl perbenzoate and 0.5% by weight of benzoyl peroxide (50% paste).

22 parts by weight of the above resin composition, 60 parts by weight of calcium carbonate NS 700 (trade name, Nitto Funkako K.K. in Japan), and 15 parts by weight of ¼-inch glass particles were admixed to prepare the premix molding powder materials. When the premix molding powder material was molded at a temperature of 145–150° C. under a molding pressure of 50 kg./cm.$^2$, the molding shrinkage was measured by the method of JIS K6911, was +0.005% (expansion).

Having now fully described the invention, it will be apparent to one of ordinary skill in the art that many changes and modifications can be made thereto without departing from the spirit or scope of the invention. Accordingly,

What is claimed as new and desired to be secured by Letters Patent is:

1. A nil shrink unsaturated polyester resin composition comprising a blend of:
    (A) 5–20% by weight of a saturated polyester resin produced by the reaction of an alcohol component containing 20–80 mol percent of neopentyl glycol and an acid component containing 70–95 mol percent of at least one acid selected from the group consisting of terephthalic acid and isophthalic acid,
    (B) 25–60% by weight of an unsaturated polyester resin having a double bond equivalency of 142–165, produced by the reaction of an acid component containing at least one acid selected from the group consisting of maleic acid, maleic acid anhydride and fumaric acid, and an alcohol component selected from the group consisting of propylene glycol, ethylene glycol, diethylene glycol and mixtures thereof, and
    (C) 60–30% by weight of an unsaturated monomer copolymerizable with the above-mentioned unsaturated polyester resin (B).

2. The nil shrink unsaturated polyester resin composition of claim 1, wherein said monomer (C) is selected from the group consisting of styrene, vinyl toluene, chlorostyrene, divinyl benzene, diallylphthalate, diallylisophthalate, triallyltrimeritate, triallylcyanurate and triallylisocyanurate.

3. The nil shrink unsaturated polyester resin composition of claim 1, wherein said unsaturated polyester resin is selected from resins formed from maleic acid anhydride, propylene glycol, fumaric acid-propylene glycol-ethylene glycol, maleic acid anhydride-ethylene glycol-diethylene glycol.

4. The nil shrink unsaturated polyester resin composition of claim 1, which further contains an inorganic filler therein.

5. The nil shrink unsaturated polyester resin composition of claim 4, wherein said inorganic filler is calcium carbonate, magnesia, zinc stearate, or glass particles.

References Cited

UNITED STATES PATENTS

| | | | |
|---|---|---|---|
| 2,550,114 | 4/1951 | Foster | 260—23 P |
| 2,628,209 | 2/1953 | Fisk | 260—861 |
| 2,642,403 | 6/1953 | Simon et al. | 260—861 |
| 2,856,378 | 10/1958 | Lundberg | 260—861 |
| 2,857,359 | 10/1958 | Schollick et al. | 260—861 |
| 3,136,733 | 6/1964 | Ross et al. | 260—861 |
| 3,227,665 | 1/1966 | Fourcade et al. | 260—873 |
| 3,549,586 | 12/1970 | Smith et al. | 260—861 |

DONALD E. CZAJA, Primary Examiner

R. W. GRIFFIN, Assistant Examiner

U.S. Cl. X.R.

161—194; 260—23 P, 40 R, 75 UA, 861, 865